United States Patent [19]

Logstrup

[11] Patent Number: 5,055,059
[45] Date of Patent: Oct. 8, 1991

[54] CURRENT CONNECTION MEMBER FOR LARGE AMPERAGES, ESPECIALLY TO BE USED IN METAL-ENCLOSED ELECTRIC SYSTEMS

[75] Inventor: Jørgen Løgstrup, Helsingør, Denmark

[73] Assignee: A/S Logstrup-Steel, Helsingor, Denmark

[21] Appl. No.: 469,502

[22] Filed: Apr. 27, 1990

[30] Foreign Application Priority Data

Sep. 4, 1987 [DK] Denmark .............................. 4634/87

[51] Int. Cl.⁵ ............................................ H01R 25/16
[52] U.S. Cl. .................................. 439/214; 174/72 B; 361/342
[58] Field of Search ............... 439/114, 212, 213, 214; 174/72 B; 361/342, 361, 378

[56] References Cited

U.S. PATENT DOCUMENTS

| | | | |
|---|---|---|---|
| 3,264,403 | 8/1966 | Erdle | 174/72 |
| 4,534,612 | 8/1985 | Loestrup et al. | 339/255 P |
| 4,867,696 | 9/1989 | Demler, Jr. et al. | 439/212 |

FOREIGN PATENT DOCUMENTS

| | | |
|---|---|---|
| 147589 B | 10/1983 | Denmark . |
| 147590 B | 10/1984 | Denmark . |
| 2062753 | 7/1972 | Fed. Rep. of Germany .... 174/72 B |
| 2630963 | 1/1978 | Fed. Rep. of Germany . |
| 3224146 | 1/1984 | Fed. Rep. of Germany . |

Primary Examiner—Gary F. Paumen
Attorney, Agent, or Firm—Merchant & Gould Smith, Edell, Welter & Schmidt

[57] ABSTRACT

A power connector element (1) for establishing of electrical connection between a busway and an outgoing or incoming electrical cable (3), generally via a multiphase coupler (8), consists of a unit (1) configured as one piece comprising a number of parallel, massive conductors disposed at a distance from one another and having connection parts at both ends, said conductors being moulded into a common electrically-insulating moulding body, so that only the connection parts are outside. The connection parts are disposed in two areas which are separated by a flange (12) in the moulding body.

4 Claims, 4 Drawing Sheets

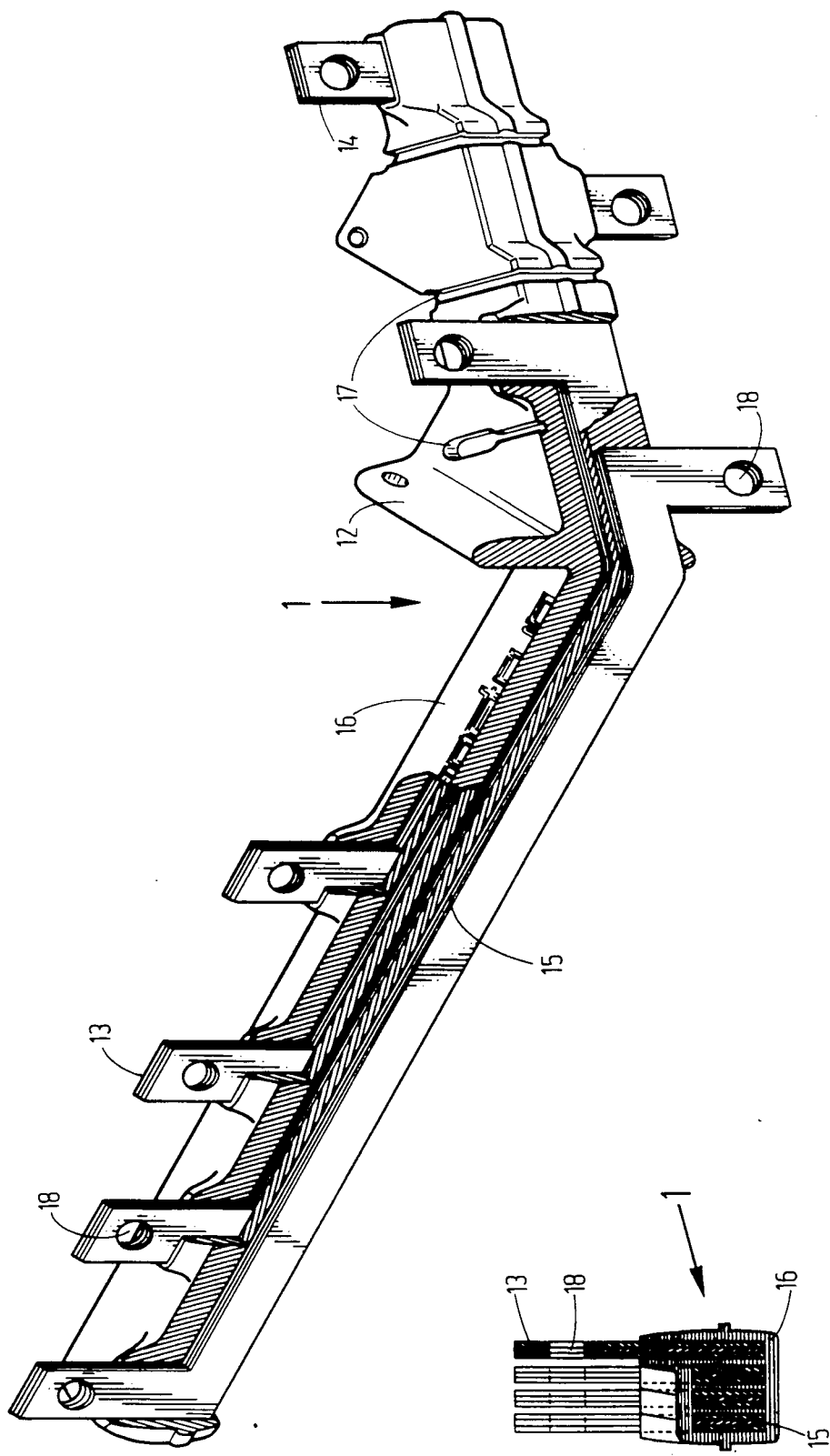

CURRENT CONNECTION MEMBER FOR LARGE AMPERAGES, ESPECIALLY TO BE USED IN METAL-ENCLOSED ELECTRIC SYSTEMS

BACKGROUND OF THE INVENTION

The invention relates to a power connector element for high current intensities.

Metal-enclosed electrical coupling systems are at present used to a very wide extent, particularly configured as module systems with, for example, module dimensions of 190 mm, but other module dimensions are also used. The electrical conductors, insulators and mounting plates or shelves, on which the many different electrical components are mounted, e.g. transformers, measuring equipment, couplers, relays, fuses, control circuits etc., are contained within the metal-enclosed system, well-protected against dirt, moisture and contact from the outside. Such metal-enclosed systems are used for the supply of current or power and for the control of electrical units and installations of almost every kind. Inside the metal-enclosed systems, solid copper busbars are normally used as conductors for electrical current or power, and as explained, e.g. in the applicant's earlier Danish patents no. 147,588, no. 147,589 and no. 147,590. Outside the metal-enclosed systems, more or less flexible cables are normally used as conductors for electrical current or power. When current or power is to be fed into or out of a metal-enclosed system, e.g for an electrical machine or an installation, an electrical coupling must be effected between one or more cables and parts in the metal-enclosed system. When high currents or high power are involved, there are relatively narrow limits for how flexible the cables are, and there are also narrow tolerances with regards to how much and how sharply such cables are able to be bent. Sharp bends in the cable can deform the conductors and the insulation, thus reducing the characteristics of the cable.

SUMMARY OF THE INVENTION

The object of the invention is to present a current connector element with which it is possible to establish an electrical connection between the individual conductors of a heavy cable and the coupling parts and the like in an electrical system, especially in a metal-enclosed system.

This is achieved by using a current connector element which, is configured as disclosed and characterized in the present invention. The conductor element achieved hereby is firm and solid, and is provided at both ends with current connector portions so that the individual cable conductors can be coupled to the one side of the current connector element, and where the other side can be coupled to the fixed parts, e.g. a main switch mounted in the electrical system, and this being effected in such a way that the cable is fed in a direct and substantially unbent manner up into one part of the system, while the coupling, e.g. to the main switch, takes place in another part of the system, the reason being that the current connector element according to the invention is at the same time herewith arranged to constitute an insulating wall lead-in. The special configuration of the current connector element according to the invention has the result that the conductors herein are overall insulated from each other and from the surroundings, and that there is access to the conductors only at the connection areas.

When the current connector element according to the invention is configured as characterized in the present invention, a very solid construction with great mechanical strength is achieved, where a lead-in, e.g. through a sheet metal wall in a metal-enclosed system, is effected under completely secure electrical insulation, while at the same time the lead-in opening in the sheet metal wall is closed. The current connector element's two areas with connecting parts can be rectilinear portions which, for example, form an angle to each other, whereby a better fitting, an easier assembly and a better utilization of space is achieved.

When the current connector element according to the invention is configured as characterized in the present invention, a complete closing of the lead-in opening is achieved, which means that no further means have to be taken into use, regardless of the extent of the demands placed on the closing of the lead-in opening.

When the current connector element according to the invention is configured as characterized in the present invention, the result is that it can be mounted directly on a coupler, e.g. a switch for current or power to a consumer, e.g. a machine. The mounting of both the cable and the current connector element can be carried out with solid clamping bolts, so that an effective electrical connection is always achieved.

When the current connector element according to the invention is configured as characterized in the present invention, a particularly simple manner of connection is achieved, so that the connector element is suitable for a number of known couplers, switches etc.

When the current connector element according to the invention is configured as characterized in the present, an increased security against outside contact is achieved, and thus an increased security against personal injuries and short-circuits. If the part which is provided with further insulation housing is that portion where the cable is connected, which is generally effected in a separate cabinet, the cabinet can be opened and inspected without any risk of touching of uninsulated parts.

If the current connector element according to the invention is further configured as characterized in the present invention, a modular construction of the insulating housing is achieved, thus enabling the free-laying of one cable at a time, for example in the event of repairs to or changes in the system.

When the current connector element according to the invention is configured as characterized in the present invention, further security is achieved against touching and/or short-circuits, in that repair work, assembly or the like can simply not be embarked upon without the current being disconnected.

Finally, if the current connector element according to the invention is configured as characterized in the present invention, one is able to ensure that it is completely impossible to open the insulating housing(s) unless the current is switched off, in that the current is disconnected automatically when access is gained to that area in the system in which the locking arrangement is disposed. Of course, the locking element can be arranged in such a way that current simply cannot be connected if the locking element is not correctly locked.

BRIEF DESCRIPTION OF THE DRAWING

The invention will now be described in more detail with reference to the drawing, which shows an embodiment of the invention in connection with the supply of electrical power from a metal-enclosed electrical system via a power cable to a consumer, e.g. a machine.

FIG. 4 shows the same as in FIG. 3, but partly in section, and FIG. 5 shows a plane vertical section in the direction V—V in FIG. 3.

DESCRIPTION OF THE PREFERRED EMBODIMENT

Figure 1:
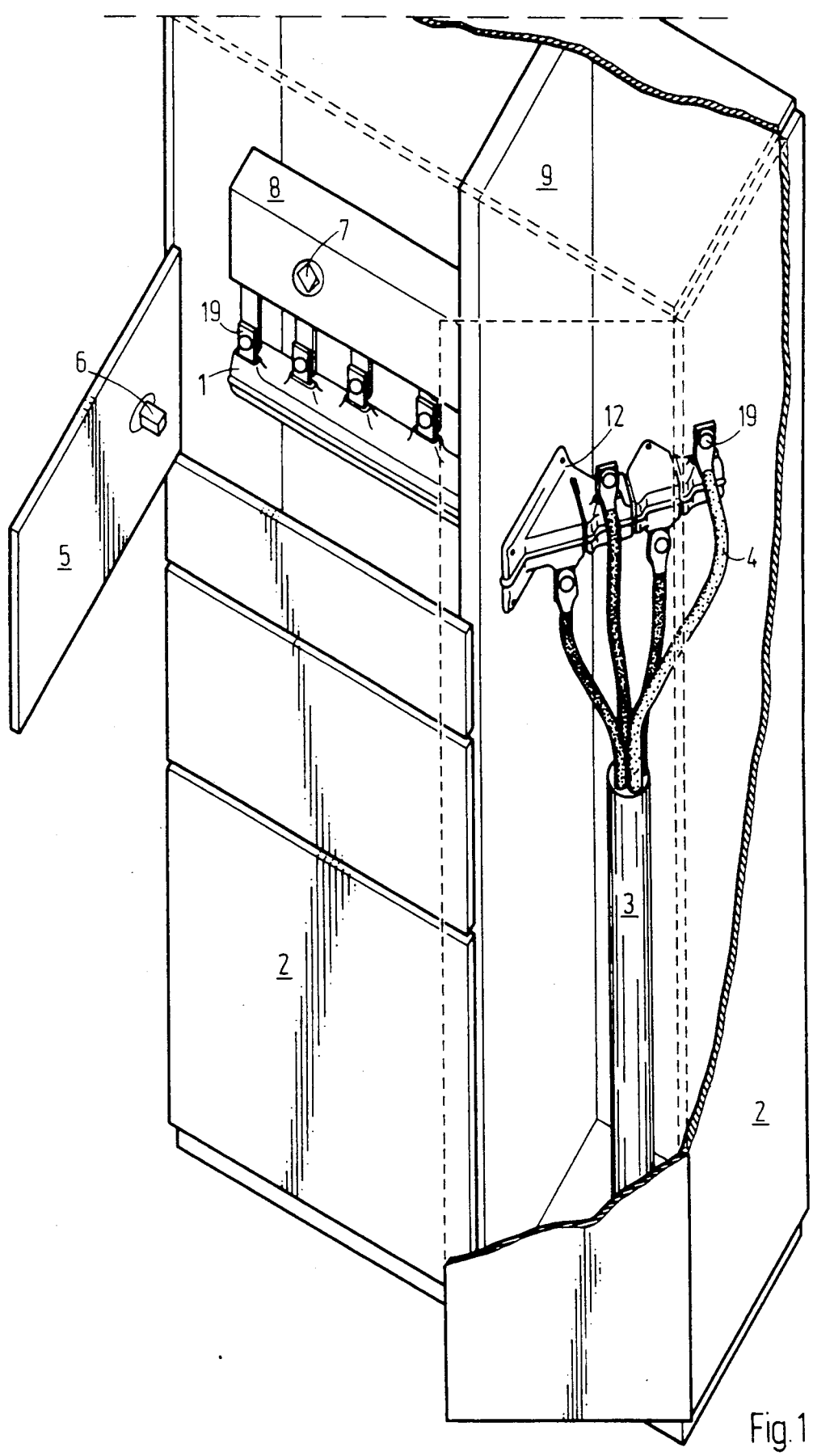
FIG. 1 shows in sketch form a part of a metal-enclosed electrical system with a current connector element according to the invention.

In FIG. 1 is seen a metal-enclosed system 2 or part of such a system comprising two vertical cabinets or cabinet sections. In the right-hand cabinet is seen a heavy power cable 3 with four conductors 4, 3-phases plus ground, which leads 3-phase power to a not -shown machine or the like.

The cable-shoe terminations on the conductors 4 are electrically connected to the one side of a current connector element 1 by means of solid bolts 19. The other side of the current connector element 1 sits in the left-hand cabinet through an opening in the intermediate wall 9, and this part is electrically connected, similarly with bolts 19, to a multi-phase switch 8, said switch 8 being maneuvered via mechanical links 6, 7 from the outside of the cabinet door 5 by a not-shown operating handle. Mechanical connection between the coupling links 6 and 7 can be established only when the door 5 is closed. The door's locking element is arranged in such a way that the door cannot be opened unless the switch 8 is off, i.e. when there is no current applied to the current connector element and the cable 3 connected thereto.

Figure 2:
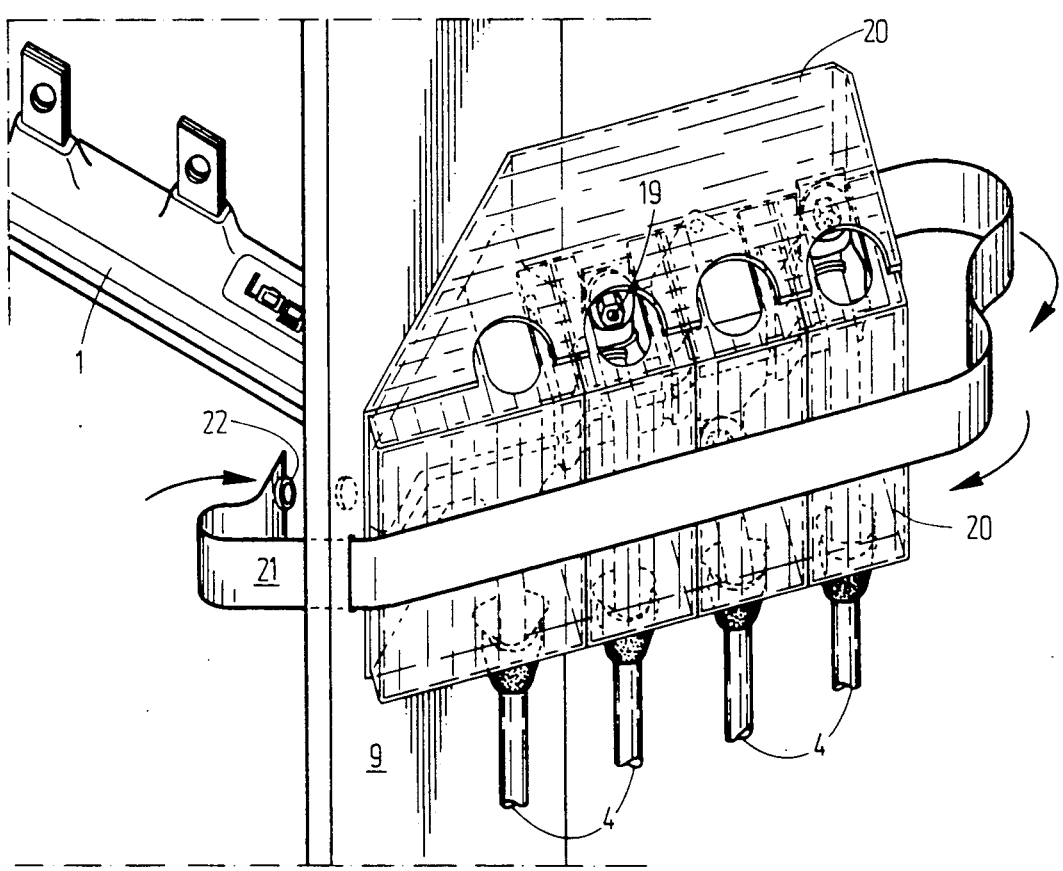
FIG. 2 shows a part of FIG. 1, and with extra insulation of the current connector element.
Figure 3:
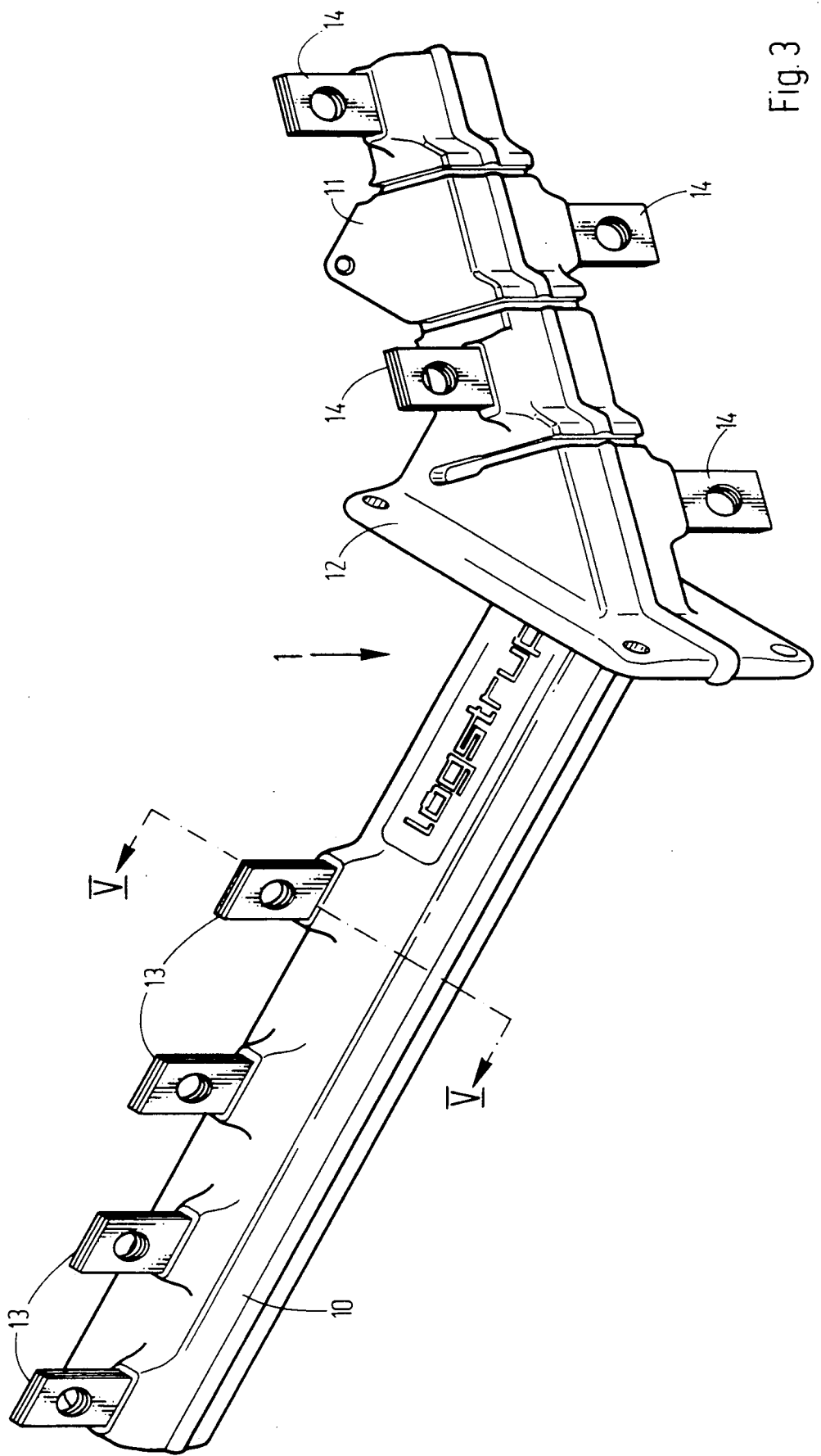
FIG. 3 shows a current connector element according to the invention.

In FIG. 2 the current connector element is seen on a larger scale, and in FIGS. 3-5 on an even larger scale. The current connector element 1 comprises (see FIGS. 3-5) a number of parallel, composite copper conductors 15 having connection portions 13, 14 formed as an integral part hereof, each with holes 18 for assembly bolts 19. All of the conductors are disposed parallel with and at a distance from each other, after which they are moulded into an insulating moulding material 16, e.g. a 2-component resin material. The two parts or areas 10 and 11 are separated by a flange 12 extending around the moulding, and the moulding is further provided with grooves or tracks 17 for the housings for extra insulation as will be discussed later. In the drawing, the areas 10 and 11 are shown rectilinear, but forming an angle with each other. It will be obvious to those familiar with the art that these areas can be configured in any form and at any angle to each other, depending on the actual application. During construction, the connection portions 13 in area 10, all of which turn towards the same side, become staggered, and the connection portions 14 in the area 11 are shown in an embodiment with oppositely directed connection parts. Naturally, the more detailed configuration of the conductors 13, 14 and 15 will depend on how the individual parts of the metal-enclosed system are arranged, and to which parts the current connector element is to be coupled. It will be obvious to those familiar with the art that innumerable different conductor configurations are possible without deviating from the basic idea.

In FIG. 2 it will be seen that the conductors are connected via bolts 19 to the connection parts 14 of the current conductor element 1, and thereafter surrounded by an insulating housing 20, or several housings 20, namely a housing or a housing part for each conductor. These housing parts are guided and held in place by the grooves 17 in the current connector element. The housings or the housing parts 20 are made of impact-proof plastic, preferably transparent plastic so that an inspection is possible without opening the housings or the housing parts. The housings or housing parts 20 are secured in a non-removable manner by a pliant belt 21, the one end of which is firmly secured to, for example, the intermediate wall 9, and the other end of which is led through an opening in the intermediate wall 9 and secured with a locking element 22 which is disposed in an adjacent cabinet, i.e. in the cabinet which also contains the switch 8. The locking element 22 is preferably designed in such a way that the current cannot be connected to the cable, i.e. the switch 8 cannot be operated, before the locking element 22 is locked correctly and the pliant belt 21 is hereby solidly and firmly secured around the protection housings 20. It will be obvious to those familiar with the art that the electrically insulating housings 20 and the belt 21, which are preferably made of an electrically insulating material, can be configured, disposed, fastened and secured in many different ways, without deviating from the spirit of the invention.

I claim:

1. A power connector element for high current intensities to establish an electrical connection between a busway of a metal-enclosed electrical system containing a plurality of adjacent cabinets and an out-going or incoming electrical cable, comprising:

a power connector element of substantially one piece, comprising a plurality of busbar pieces positioned in a parallel manner, but at a distance from one another;

a plurality of connection parts with mounting holes, said connection parts being configured as one piece with said busbar pieces, said connection parts located substantially at the first and second ends of said busbar pieces and attached at substantially right angles to said busbar pieces whereby all the connection parts in at least one of said cabinets extend out in the same direction;

a common, electrically-insulating body molded around said busbar pieces so that only said connection parts are outside said electrically-insulating body;

a first adjacent cabinet wherein said electrical cable is coupled to said power connector element so that all of said connection parts on said first end of said busbar pieces are disposed in said first adjacent cabinet;

a second adjacent cabinet separated from said first adjacent cabinet, wherein the coupling of said power connector element to said busway is established so that all of said connection parts on said second end of said busbar pieces are disposed in said second adjacent cabinet;

a flange molded in said electrically-insulating body on said power connectior element such that said flange is substantially planar and extends around said busbar pieces at substantially right angles to said busbar pieces at a location between said connection parts such that said flange is disposed between said first and second adjacent cabinets, thus separating said cabinets.

2. The power connector element of claim 1, wherein an electrically insulated housing substantially surrounds said power connector element in at least one of said adjacent cabinets.

3. The power connector element of claim 2, wherein said electrically insulated housing is divided into a plurality of separate housings for individual conductors of said electrical cable, whereby each of said separate housings is releasably secured to said electrically-insulating body.

4. The power connector element of claim 3 wherein said electrically insulated housing is releasably secured by a retaining element in the form of a pliant belt of electrically insulating material.

* * * * *

UNITED STATES PATENT AND TRADEMARK OFFICE
CERTIFICATE OF CORRECTION

PATENT NO. : 5,055,059

DATED : 8 October 1991

INVENTOR(S) : Jorgen Logstrup

It is certified that error appears in the above-identified patent and that said Letters Patent is hereby corrected as shown below:

Title page, after "Filed: Apr. 27, 1990", insert
--[22] PCT Filed:      Aug. 18, 1988
  [86] PCT No.:        PCT/DK88/00136
       §371 Date:      April 27, 1990
       §102(e) Date:   April 27, 1990
  [87] PCT Pub. No.:   WO89/02177
       PCT Pub. Date:  March 9, 1989

Column 2, line 36 & 37 delete "present" and insert --present invention--.

Column 4, line 68 delete "connectior" and insert --connector--.

Signed and Sealed this

Third Day of August, 1993

Attest:

MICHAEL K. KIRK

*Attesting Officer*          *Acting Commissioner of Patents and Trademarks*